United States Patent
Sekine et al.

(10) Patent No.: US 12,379,577 B2
(45) Date of Patent: Aug. 5, 2025

(54) IMAGING LENS

(71) Applicant: Tokyo Visionary Optics Co., Ltd., Tokyo (JP)

(72) Inventors: Yukio Sekine, Tokyo (JP); Koki Tokuno, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 630 days.

(21) Appl. No.: 17/456,515

(22) Filed: Nov. 24, 2021

(65) Prior Publication Data

US 2023/0064302 A1 Mar. 2, 2023

(30) Foreign Application Priority Data

Nov. 24, 2020 (JP) ................. 2020-194706

(51) Int. Cl.
*G02B 13/18* (2006.01)
*G02B 9/64* (2006.01)

(52) U.S. Cl.
CPC ............ *G02B 13/18* (2013.01); *G02B 9/64* (2013.01)

(58) Field of Classification Search
CPC .................. G02B 13/18; G02B 9/64
USPC ........................................ 359/713
See application file for complete search history.

(56) References Cited

U.S. PATENT DOCUMENTS

| | | | |
|---|---|---|---|
| 2019/0179101 A1 | 6/2019 | Li et al. | |
| 2019/0196144 A1 | 6/2019 | Chen et al. | |
| 2019/0302423 A1 | 10/2019 | Huang | |
| 2020/0409060 A1 | 12/2020 | Oinuma et al. | |
| 2021/0048623 A1* | 2/2021 | Dai | G02B 9/64 |
| 2021/0048631 A1 | 2/2021 | Fukaya | |
| 2021/0364747 A1* | 11/2021 | Teranishi | G02B 13/18 |
| 2021/0364748 A1* | 11/2021 | Yamazaki | G02B 13/0045 |

FOREIGN PATENT DOCUMENTS

| | | |
|---|---|---|
| CN | 208705550 U | 4/2019 |
| CN | 110346902 A | 10/2019 |
| CN | 111897097 A | 11/2020 |

* cited by examiner

*Primary Examiner* — James A Dudek
(74) *Attorney, Agent, or Firm* — Maine Cernota & Curran

(57) ABSTRACT

There is provided an imaging lens with excellent optical characteristics which satisfies demand of a low profile and a low F-number. An imaging lens comprises in order from an object side to an image side, a first lens with positive refractive power, a second lens, a third lens, a fourth lens, a fifth lens with positive refractive power, a sixth lens, and a seventh lens with negative refractive power, wherein said first lens has an object-side surface being convex in a paraxial region, and said fifth lens has an image-side surface being convex in a paraxial region, and predetermined conditional expressions are satisfied.

7 Claims, 5 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN110346902A) discloses an imaging lens comprising, in order from an object side, a first lens, a second lens, a third lens, a fourth lens, a fifth lens, a sixth lens, and a seventh lens, and a relationship between a focal length of the first lens and a focal length of the overall optical system, a refractive index of the second lens, a relationship between a focal length of the third lens and a focal length of the fourth lens, a relationship between a paraxial curvature radius of an object-side surface of the seventh lens and a paraxial curvature radius of an image-side surface of the seventh lens, and a refractive index of the fifth lens satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (surface being convex)", "a concave surface (surface being concave)" or "a flat surface (surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" are distances obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power, a second lens, a third lens, a fourth lens, a fifth lens with positive refractive power, a sixth lens, and a seventh lens with negative refractive power, wherein said first lens has an object-side surface being convex in a paraxial region, and said fifth lens has an image-side surface being convex in a paraxial region.

The first lens has the positive refractive power, aspheric surfaces on both sides, and the object-side surface being convex in the paraxial region. Therefore, spherical aberration, coma aberration, astigmatism, field curvature, and distortion are suppressed.

The second lens has aspheric surfaces on both sides, and the coma aberration, the astigmatism, the field curvature, and the distortion are properly corrected.

The third lens has aspheric surfaces on both sides, and the coma aberration, the astigmatism, and the distortion are properly corrected.

The fourth lens has aspheric surfaces on both sides, and the coma aberration, the astigmatism, and the distortion are properly corrected.

The fifth lens has the positive refractive power, aspheric surfaces on both sides, and the image-side surface being convex in the paraxial region. Therefore, the astigmatism, the field curvature, and distortion are properly corrected.

The sixth lens has aspheric surfaces on both sides, and the coma aberration, the astigmatism, the field curvature, and the distortion are properly corrected.

The seventh lens has the negative refractive power and aspheric surfaces on both sides. Therefore, chromatic aberration, the astigmatism, the field curvature, and distortion are properly corrected.

According to the imaging lens having the above-described configuration, it is preferable that an image-side surface of the first lens is concave in the paraxial region.

When the image-side surface of the first lens is concave in the paraxial region, the astigmatism, the field curvature, and the distortion can be properly corrected.

According to the imaging lens having the above-described configuration, it is preferable that an object-side surface of the sixth lens is convex in the paraxial region.

When the object-side surface of the sixth lens is convex in the paraxial region, the coma aberration, the astigmatism, the field curvature, and the distortion can be properly corrected.

According to the imaging lens having the above-described configuration, it is preferable that the object-side surface of the sixth lens is formed as an aspheric surface having at least one pole point in a position off the optical axis.

When the object-side surface of the sixth lens is formed as the aspheric surface having at least one pole point in the position off the optical axis, the astigmatism, the field curvature, and the distortion can be more properly corrected.

According to the imaging lens having the above-described configuration, it is preferable that an image-side surface of the sixth lens is concave in the paraxial region.

When the image-side surface of the sixth lens is concave in the paraxial region, the coma aberration, the astigmatism, the field curvature, and the distortion can be properly corrected.

According to the imaging lens having the above-described configuration, it is preferable that the image-side surface of the sixth lens is formed as an aspheric surface having at least one pole point in a position off the optical axis.

When the image-side surface of the sixth lens is formed as the aspheric surface having at least one pole point in the position off the optical axis, the astigmatism, the field curvature, and the distortion can be more properly corrected.

The imaging lens according to the present invention, due to the above-mentioned configuration, achieves a low profile which a ratio of a total track length to a diagonal length of an effective image area of the image sensor is 0.80 or less and a low F number of 2.1 or less.

According to the imaging lens having the above-described configuration, it is preferable that the following conditional expression (1) is satisfied:

$$13.00 < vd3 < 33.5 \tag{1}$$

where vd3: an abbe number at d-ray of the third lens.

By satisfying the conditional expression (1), the chromatic aberration can be properly corrected.

According to the imaging lens having the above-described configuration, it is preferable that the following conditional expression (2) is satisfied:

$$13.00 < vd4 < 31.0 \tag{2}$$

where vd4: an abbe number at d-ray of the fourth lens.

By satisfying the conditional expression (2), the chromatic aberration can be properly corrected.

According to the imaging lens having the above-described configuration, it is preferable that the following conditional expression (3) is satisfied:

$$-3.00 < |r13|/f7 < -0.25 \tag{3}$$

where r13: a paraxial curvature radius of an object-side surface of the seventh lens, and f7: a focal length of the seventh lens.

By satisfying the conditional expression (3), the chromatic aberration, the astigmatism, the field curvature, and the distortion can be properly corrected.

According to the imaging lens having the above-described configuration, it is preferable that the following conditional expression (4) is satisfied:

$$2.2\ \text{mm} < f5 \times T4 \tag{4}$$

where f5: a focal length of the fifth lens, and

T4: a distance along the optical axis from an image-side surface of the fourth lens to an object-side surface of the fifth lens.

By satisfying the conditional expression (4), the astigmatism, the field curvature, and the distortion can be properly corrected.

According to the imaging lens having the above-described configuration, it is preferable that the following conditional expression (5) is satisfied:

$$1.7 < r12/|r9| \times |r6| < 18.0 \tag{5}$$

where r12: a paraxial curvature radius of an image-side surface of the sixth lens, r9: a paraxial curvature radius of an object-side surface of the fifth lens, and r6: a paraxial curvature radius of an image-side surface of the third lens.

By satisfying the conditional expression (5), the coma aberration, the astigmatism, the field curvature, and the distortion can be properly corrected.

According to the imaging lens having the above-described configuration, it is preferable that the following conditional expression (6) is satisfied:

$$3.4 < |f4|/f < 31.0 \tag{6}$$

where f4: a focal length of the fourth lens, and f: a focal length of the overall optical system of the imaging lens.

By satisfying the conditional expression (6), the coma aberration, the astigmatism, and the distortion can be properly corrected.

According to the imaging lens having the above-described configuration, it is preferable that the following conditional expression (7) is satisfied:

$$0.1 < r2/|r6| < 1.5 \tag{7}$$

where r2: a paraxial curvature radius of an image-side surface of the first lens, and r6: a paraxial curvature radius of an image-side surface of the third lens.

By satisfying the conditional expression (7), the coma aberration, the astigmatism, the field curvature, and the distortion can be properly corrected.

According to the imaging lens having the above-described configuration, it is preferable that the following conditional expression (8) is satisfied:

$$0.1 < |r6/r7| < 5.0 \tag{8}$$

where r6: a paraxial curvature radius of an image-side surface of the third lens, and r7: a paraxial curvature radius of an object-side surface of the fourth lens.

By satisfying the conditional expression (8), the coma aberration, the astigmatism, and the distortion can be properly corrected.

According to the imaging lens having the above-described configuration, it is preferable that the following conditional expression (9) is satisfied:

$$0.8 < |r7|/f < 7.0 \tag{9}$$

where r7: a paraxial curvature radius of an object-side surface of the fourth lens, and f: a focal length of the overall optical system of the imaging lens.

By satisfying the conditional expression (9), the coma aberration, the astigmatism, and the distortion can be properly corrected.

According to the imaging lens having the above-described configuration, it is preferable that the following conditional expression (10) is satisfied:

$$1.2 < |r8|/f < 35.0 \tag{10}$$

where r8: a paraxial curvature radius of an image-side surface of the fourth lens, and f: a focal length of the overall optical system of the imaging lens.

By satisfying the conditional expression (10), the coma aberration, the astigmatism, and the distortion can be properly corrected.

According to the imaging lens having the above-described configuration, it is preferable that the following conditional expression (11) is satisfied:

$$-0.75 < r10/f5 < 0.00 \tag{11}$$

where r10: a paraxial curvature radius of an image-side surface of the fifth lens, and f5: a focal length of the fifth lens.

By satisfying the conditional expression (11), the astigmatism, the field curvature, and the distortion can be properly corrected.

According to the imaging lens having the above-described configuration, it is preferable that the following conditional expression (12) is satisfied:

$$1.4 < f5/f \quad (12)$$

where f5: a focal length of the fifth lens, and f: a focal length of the overall optical system of the imaging lens.

By satisfying the conditional expression (12), the astigmatism, the field curvature, and the distortion can be properly corrected.

According to the imaging lens having the above-described configuration, it is preferable that the following conditional expression (13) is satisfied:

$$0.00 < |f4|/f5 < 7.25 \quad (13)$$

where f4: a focal length of the fourth lens, and f5: a focal length of the fifth lens.

By satisfying the conditional expression (13), the coma aberration, the astigmatism, the field curvature, and the distortion can be properly corrected.

According to the imaging lens having the above-described configuration, it is preferable that the following conditional expression (14) is satisfied:

$$-1.15 < |f4|/f5/f7 < 0.00 \quad (14)$$

where f4: a focal length of the fourth lens, f5: a focal length of the fifth lens, and f7: a focal length of the seventh lens.

By satisfying the conditional expression (14), the chromatic aberration, the coma aberration, the astigmatism, the field curvature, and the distortion can be properly corrected.

According to the imaging lens having the above-described configuration, it is preferable that the following conditional expression (15) is satisfied:

$$-1.25 < f7/f < -0.30 \quad (15)$$

where f7: a focal length of the seventh lens, and f: a focal length of the overall optical system of the imaging lens.

By satisfying the conditional expression (15), the chromatic aberration, the astigmatism, the field curvature, and the distortion can be properly corrected.

According to the imaging lens having the above-described configuration, it is preferable that the following conditional expression (16) is satisfied:

$$0.3 < |r4|/f < 11.0 \quad (16)$$

where r4: a paraxial curvature radius of an image-side surface of the second lens, and f: a focal length of the overall optical system of the imaging lens.

By satisfying the conditional expression (16), the coma aberration, the astigmatism, the field curvature, and the distortion can be properly corrected.

According to the imaging lens having the above-described configuration, it is preferable that the following conditional expression (17) is satisfied:

$$0.05 < r4/r5 < 6.00 \quad (17)$$

where r4: a paraxial curvature radius of an image-side surface of the second lens, and r5: a paraxial curvature radius of an object-side surface of the third lens.

By satisfying the conditional expression (17), the coma aberration, the astigmatism, the field curvature, and the distortion can be properly corrected.

According to the imaging lens having the above-described configuration, it is preferable that the following conditional expression (18) is satisfied:

$$0.65 < |r6|/f < 8.00 \quad (18)$$

where r6: a paraxial curvature radius of an image-side surface of the third lens, and f: a focal length of the overall optical system of the imaging lens.

By satisfying the conditional expression (18), the coma aberration, the astigmatism, and the distortion can be properly corrected.

According to the imaging lens having the above-described configuration, it is preferable that the following conditional expression (19) is satisfied:

$$-4.0 < r10/f < -0.2 \quad (19)$$

where r10: a paraxial curvature radius of an image-side surface of the fifth lens, and f: a focal length of the overall optical system of the imaging lens.

By satisfying the conditional expression (19), the astigmatism, the field curvature, and the distortion can be properly corrected.

According to the imaging lens having the above-described configuration, it is preferable that the following conditional expression (20) is satisfied:

$$0.05 < r12/|r9| < 1.25 \quad (20)$$

where r12: a paraxial curvature radius of an image-side surface of the sixth lens, and r9: a paraxial curvature radius of an object-side surface of the fifth lens.

By satisfying the conditional expression (20), the coma aberration, the astigmatism, the field curvature, and the distortion can be properly corrected.

According to the imaging lens having the above-described configuration, it is preferable that the following conditional expression (21) is satisfied:

$$0.25 < r12/|r13| < 3.50 \quad (21)$$

where r12: a paraxial curvature radius of an image-side surface of the sixth lens, and r13: a paraxial curvature radius of an object-side surface of the seventh lens.

By satisfying the conditional expression (21), the coma aberration, the astigmatism, the field curvature, and the distortion can be properly corrected.

According to the imaging lens having the above-described configuration, it is preferable that the following conditional expression (22) is satisfied:

$$2.0 < |r13|/D7 < 27.5 \quad (22)$$

where r13: a paraxial curvature radius of an object-side surface of the seventh lens, and D7: a thickness along the optical axis of the seventh lens.

By satisfying the conditional expression (22), reduction in a profile can be achieved, and the astigmatism, the field curvature, and the distortion can be properly corrected.

According to the imaging lens having the above-described configuration, it is preferable that the following conditional expression (23) is satisfied:

$$-31.0 < |r14|/f7 < -0.2 \qquad (23)$$

where r14: a paraxial curvature radius of an image-side surface of the seventh lens, and f7: a focal length of the seventh lens.

By satisfying the conditional expression (23), the chromatic aberration, the astigmatism, the field curvature, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7 and 9 are schematic views of the imaging lenses in Examples 1 to 5 according to the embodiments of the present invention, respectively. The preferred embodiment of the present invention will be described in detail below referring to FIG. 1.

Figure 1:
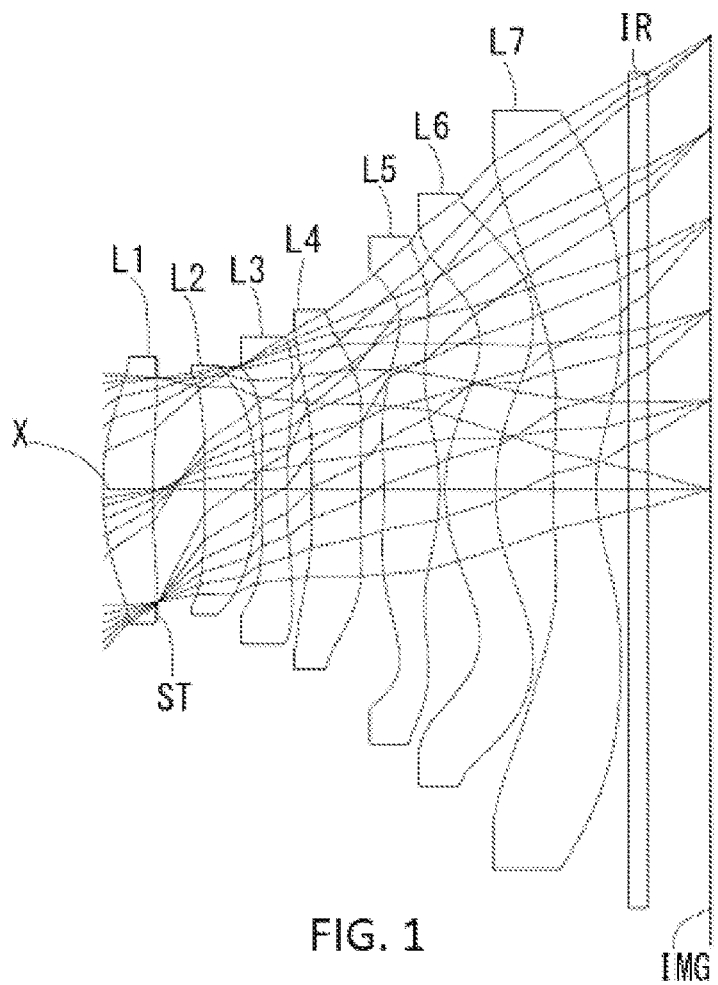
FIG. 1 is a schematic view showing an imaging lens in Example 1 according to the present invention.

As shown in FIG. 1, the imaging lens according to the present invention comprises, in order from an object side to an image side, a first lens L1 with positive refractive power, a second lens L2, a third lens L3, a fourth lens L4, a fifth lens L5 with positive refractive power, a sixth lens L6, and a seventh lens L7 with negative refractive power, wherein said first lens L1 has an object-side surface being convex in a paraxial region, and said fifth lens L5 has an image-side surface being convex in a paraxial region.

A filter IR such as an IR cut filter or a cover glass is arranged between the seventh lens L7 and an image plane IMG (namely, the image plane of an image sensor). The filter IR is omissible.

An aperture stop ST is disposed between the first lens L1 and the second lens L2, and correction of distortion becomes facilitated. A location of the aperture stop ST is not limited to the one between the first lens L1 and the second lens L2. The aperture stop ST may be disposed according to a specification of the image sensor.

The first lens L1 has the positive refractive power and is formed in a meniscus shape having the object-side surface being convex in the paraxial region (near the optical axis X). Furthermore, aspheric surfaces are formed on both sides. Therefore, spherical aberration, coma aberration, astigmatism, field curvature, and distortion are suppressed.

The second lens L2 has the positive refractive power and is formed in a meniscus shape having an object-side surface being concave in the paraxial region (near the optical axis X). Furthermore, aspheric surfaces are formed on both sides. Therefore, reduction in a profile is achieved, and the coma aberration, the astigmatism, the field curvature, and the distortion are properly corrected.

Figure 3:
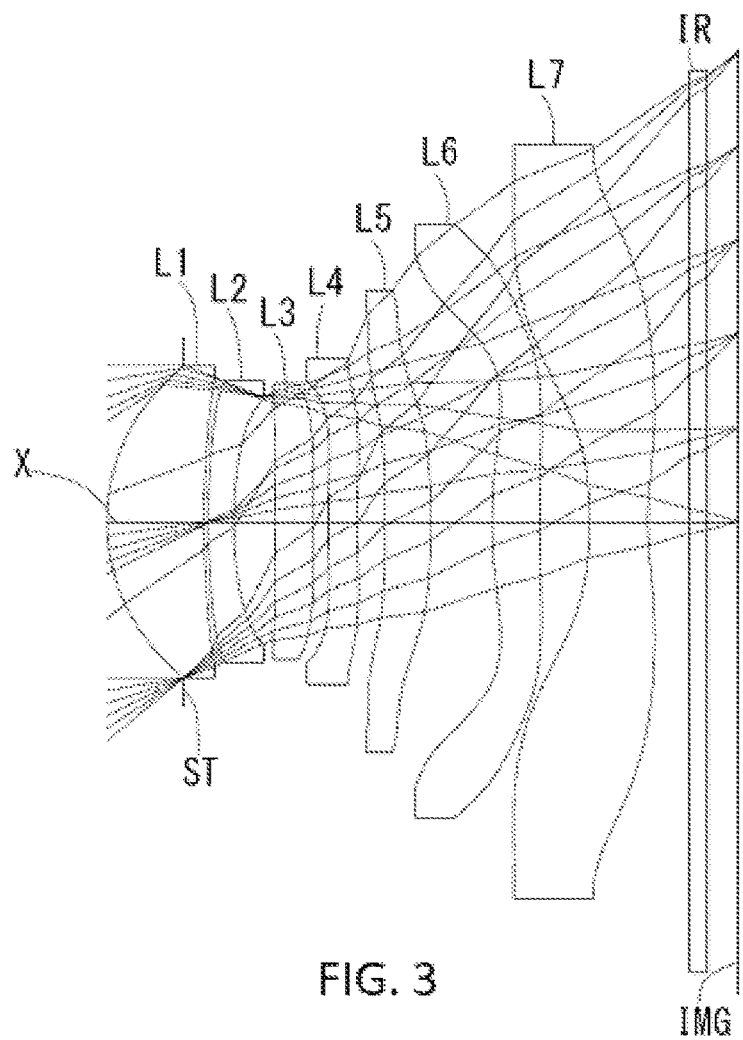
FIG. 3 is a schematic view showing an imaging lens in Example 2 according to the present invention.

Refractive power of the second lens L2 may be negative as in Example 2 shown in FIG. 3. In this case, the second lens L2 is favorable for correction of chromatic aberration.

Figure 5:
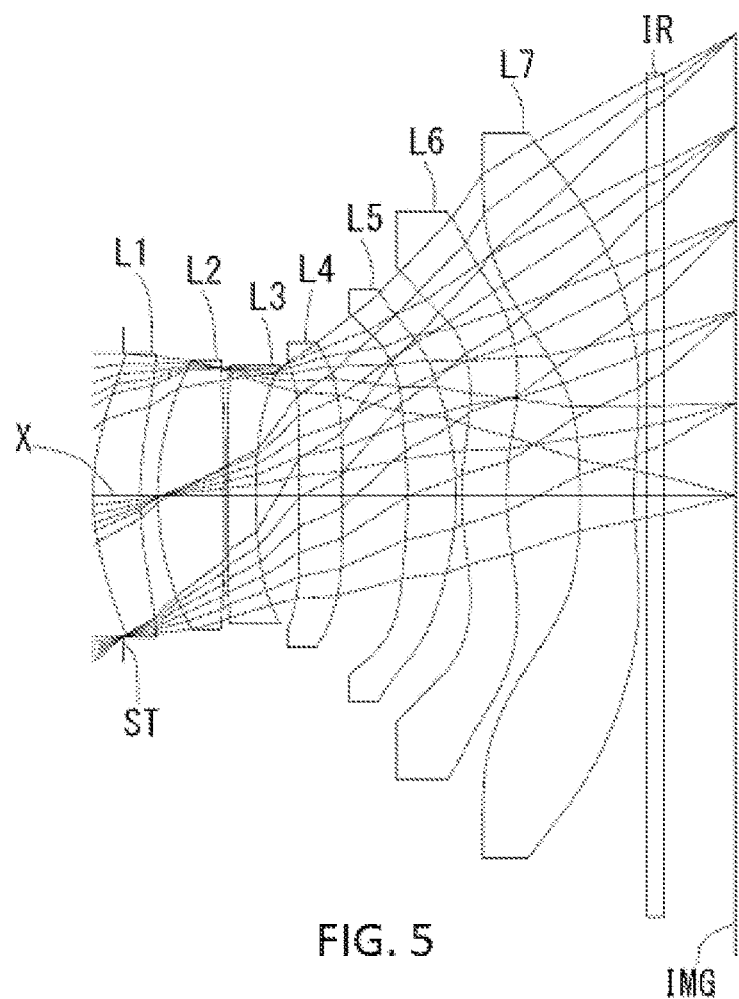
FIG. 5 is a schematic view showing an imaging lens in Example 3 according to the present invention.
Figure 7:
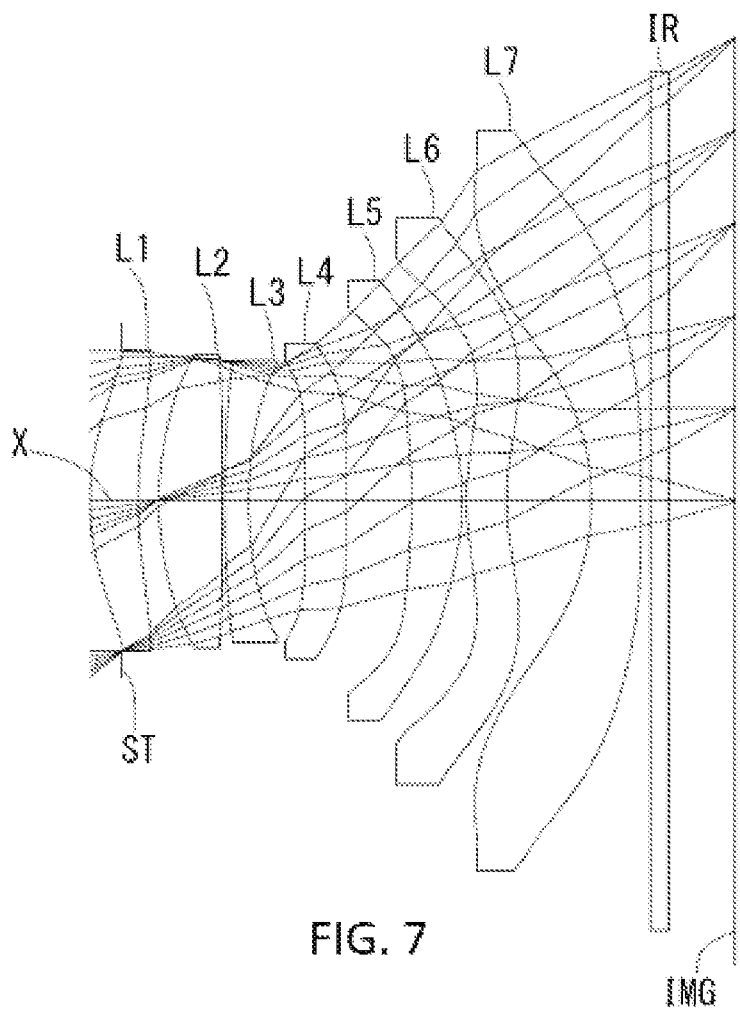
FIG. 7 is a schematic view showing an imaging lens in Example 4 according to the present invention.

A shape of the second lens L2 may be a meniscus shape having the object-side surface being convex and an image-side surface being concave in the paraxial region as in Examples 2, 3 and 4 shown in FIGS. 3, 5 and 7. In this case, the second lens L2 is favorable for correction of the coma aberration, the astigmatism, the field curvature, and the distortion. Additionally, the shape of the second lens L2 may be a biconvex shape in the paraxial region as in Example 5 shown in FIG. 9. In this case, positive refractive powers on both sides are favorable for reduction in the profile.

The third lens L3 has negative refractive power and is formed in a biconcave shape in the paraxial region (near the optical axis X). Furthermore, aspheric surfaces are formed on both sides. Therefore, the chromatic aberration, the coma aberration, the astigmatism, and the distortion are properly corrected.

Refractive power of the third lens L3 may be positive as in Example 2 shown in FIG. 3. In this case, the third lens L3 is favorable for reduction in the profile.

A shape of the third lens L3 may be a meniscus shape having the object-side surface being convex and an image-side surface being concave in the paraxial region as in Examples 2, 3 and 4 shown in FIGS. 3, 5 and 7. In this case, the third lens L3 is favorable for correction of the coma aberration, the astigmatism, and the distortion. Additionally, the shape of the third lens L3 may be a meniscus shape having the object-side surface being concave and the image-side surface being convex in the paraxial region as in Example 5 shown in FIG. 9. In this case, the third lens L3 is favorable for correction of the coma aberration, the astigmatism, and the distortion.

The fourth lens L4 has negative refractive power and is formed in a biconcave shape in the paraxial region. Furthermore, aspheric surfaces are formed on both sides. Therefore, the chromatic aberration, the coma aberration, the astigmatism, and the distortion are properly corrected.

Refractive power of the fourth lens L4 may be positive as in Examples 2, 3, 4 and 5 shown in FIGS. 3, 5, 7 and 9. In this case, the fourth lens L4 is favorable for reduction in the profile.

A shape of the fourth lens L4 may be a meniscus shape having an object-side surface being convex and an image-side surface being concave in the paraxial region as in Examples 2, 3 and 4 shown in FIGS. 3, 5 and 7. In this case, the fourth lens L4 is favorable for correction of the coma aberration, the astigmatism, and the distortion. Additionally, the shape of the fourth lens L4 may be a meniscus shape having the object-side surface being concave and the image-side surface being convex in the paraxial region as in Example 5 shown in FIG. 9. In this case, the fourth lens L4 is favorable for correction of the coma aberration, the astigmatism, and the distortion.

The fifth lens L5 has the positive refractive power and is formed in a meniscus shape having the image-side surface being convex in the paraxial region. Furthermore, aspheric surfaces are formed on both sides. Therefore, the astigmatism, the field curvature, and the distortion are properly corrected.

A shape of the fifth lens L5 may be a biconvex shape in the paraxial region as in Example 2 shown in FIG. 3. In this case, positive refractive powers on both sides are favorable for reduction in the profile.

The sixth lens L6 has the positive refractive power and is formed in a meniscus shape having an object-side surface being convex and an image-side surface being concave in the paraxial region. Furthermore, aspheric surfaces are formed on both sides. Therefore, the coma aberration, the astigmatism, the field curvature, and the distortion are properly corrected.

Figure 9:
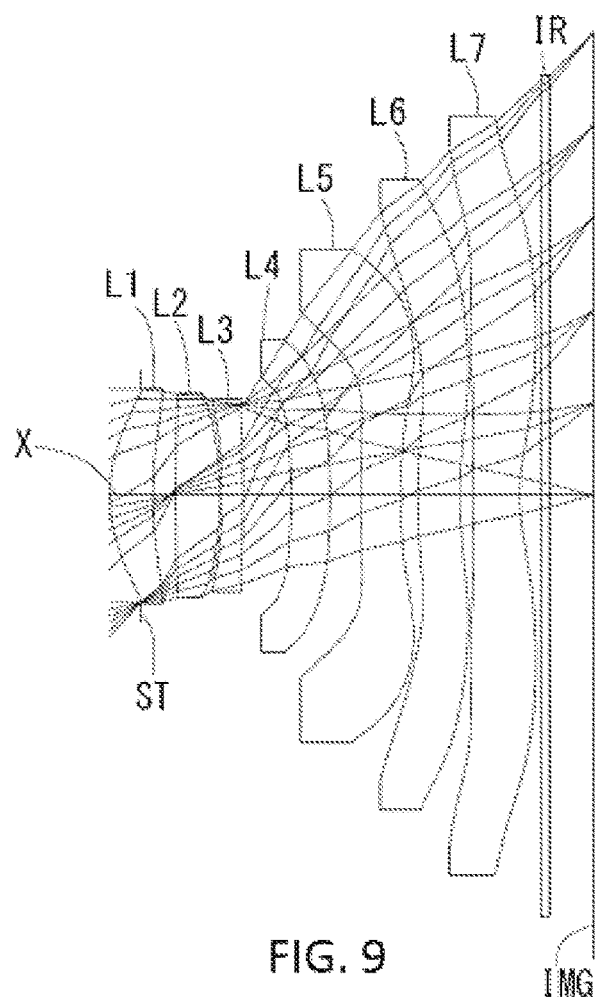
FIG. 9 is a schematic view showing an imaging lens in Example 5 according to the present invention.

Refractive power of the sixth lens L6 may be negative as in Examples 3, 4, and 5 shown in FIGS. 5, 7, and 9. In this case, the sixth lens L6 is favorable for correction of the chromatic aberration.

The aspheric surface of the object-side surface of the sixth lens L6 has at least one pole point in a position off the optical axis X. Therefore, the astigmatism, the field curvature, and the distortion are more properly corrected.

The aspheric surface of the image-side surface of the sixth lens L6 has at least one pole point in a position off the optical axis X. Therefore, the astigmatism, the field curvature, and the distortion are more properly corrected.

The seventh lens L7 has the negative refractive power and is formed in a meniscus shape having an object-side surface being convex and an image-side surface being concave in the paraxial region. Furthermore, both-side surfaces of the seventh lens L7 are formed as aspheric surfaces. Therefore, the chromatic aberration, the astigmatism, the field curvature, and the distortion are properly corrected.

A shape of the seventh lens L7 may be a biconcave shape in the paraxial region as in Examples 2 and 3 shown in FIGS. 3 and 5. In this case, negative refractive powers on both sides are favorable for correction of the chromatic aberration. Furthermore, a shape of the seventh lens L7 may be a meniscus shape having the object-side surface being concave and the image-side surface being convex in the paraxial region as in Example 4 shown in FIG. 7. In this case, the seventh lens L7 is favorable for correction of the astigmatism, the field curvature, and the distortion.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are properly corrected. Furthermore, in comparison with the case in which a cemented lens is used, workload is reduced, and manufacturing in low cost can be realized.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effects by satisfying the following conditional expressions (1) to (23), $$13.00 < vd3 < 33.5 \tag{1}$$

$$13.00 < vd4 < 31.0 \tag{2}$$

$$-3.00 < |r13|/f7 < -0.25 \tag{3}$$

$$2.2\ mm \le f5 \times T4 \tag{4}$$

$$1.7 < r12/|r9| \times |r6| < 18.0 \tag{5}$$

$$3.4 < |f4|/f < 31.0 \tag{6}$$

$$0.1 < r2/|r6| < 1.5 \tag{7}$$

$$0.1 < |r6/r7| < 5.0 \tag{8}$$

$$0.8 < |r7|/f < 7.0 \tag{9}$$

$$1.2 < |r8|/f < 35.0 \tag{10}$$

$$-0.75 < r10/f5 < 0.00 \tag{11}$$

$$1.4 < f5/f \tag{12}$$

$$0.00 < |f4|/f5 < 7.25 \tag{13}$$

$$-1.15 < |f4|/f5/f7 < 0.00 \tag{14}$$

$$-1.25 < f7/f < -0.30 \tag{15}$$

$$0.3 < |r4|/f < 11.0 \tag{16}$$

$$0.05 < r4/r5 < 6.00 \tag{17}$$

$$0.65 < |r6|/f < 8.00 \tag{18}$$

$$-4.0 < r10/f < -0.2 \tag{19}$$

$$0.05 < r12/|r9| < 1.25 \tag{20}$$

0.25<|r12/|r13|<3.50 (21)

2.0<|r13|/D7<27.5 (22)

−31.0<|r14|/f7<−0.2 (23)

where
vd3: an abbe number at d-ray of the third lens L3,
vd4: an abbe number at d-ray of the fourth lens L4,
D7: a thickness along the optical axis X of the seventh lens L7,
T4: a distance along the optical axis X from an image-side surface of the fourth lens L4 to an object-side surface of the fifth lens L5,
f: a focal length of the overall optical system of the imaging lens,
f4: a focal length of the fourth lens L4,
f5: a focal length of the fifth lens L5,
f7: a focal length of the seventh lens L7,
r2: a paraxial curvature radius of an image-side surface of the first lens L1,
r4: a paraxial curvature radius of an image-side surface of the second lens L2,
r5: a paraxial curvature radius of an object-side surface of the third lens L3,
r6: a paraxial curvature radius of an image-side surface of the third lens L3,
r7: a paraxial curvature radius of an object-side surface of the fourth lens L4,
r8: a paraxial curvature radius of an image-side surface of the fourth lens L4,
r9: a paraxial curvature radius of an object-side surface of the fifth lens L5,
r10: a paraxial curvature radius of an image-side surface of the fifth lens L5,
r12: a paraxial curvature radius of an image-side surface of the sixth lens L6,
r13: a paraxial curvature radius of an object-side surface of the seventh lens L7, and
r14: a paraxial curvature radius of an image-side surface of the seventh lens L7.

It is not necessary to satisfy the above all conditional expressions. An operational advantage corresponding to each conditional expression can be obtained by satisfying the conditional expression individually.

The imaging lens according to the present embodiments shows further preferable effects by satisfying the following conditional expressions (1a) to (23a), 16.0<vd3<29.5 (1a)

16.0<vd4<27.0 (2a)

−2.5<|r13|/f7<−0.4 (3a)

2.9 mm<f5×T4<3000.0 mm (4a)

2.1<r12/|r9|×|r6|<15.0 (5a)

4.0<|f4|/f<14.5 (6a)

0.15<r2/|r6|<1.25 (7a)

0.15<|r6/r7|<4.00 (8a)

1.2<|r7|/f<5.5 (9a)

1.4<|r8|/f<24.0 (10a)

−0.7<r10/f5<0.0 (11a)

1.5<f5/f<1000.0 (12a)

0.01<|f4|/f5<6.75 (13a)

−1.11<|f4|/f5/f7<0.00 (14a)

−1.15<f7/f<−0.50 (15a)

0.5<|r4|/f<9.0 (16a)

0.1<r4/r5<4.0 (17a)

0.7<|r6|/f<6.5 (18a)

−3.5<r10/f<−0.3 (19a)

0.15<r12/|r9|<1.00 (20a)

0.35<r12/|r13|<2.80 (21a)

3.5<|r13|/D7<22.5 (22a)

−25.0<|r14|/f7<−0.3. (23a)

The signs in the above conditional expressions have the same meanings as those in the paragraph before the preceding paragraph. Additionally, only lower limits or upper limits of the conditional expressions (1a) to (23a) may be applied to the corresponding conditional expressions (1) to (23).

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1-(k+1)\frac{H^2}{R^2}}} + A_4H^4 + A_6H^6 + A_8H^8 +$$
$$A_{10}H^{10} + A_{12}H^{12} + A_{14}H^{14} + A_{16}H^{16} + A_{18}H^{18} + A_{20}H^{20}$$

[Equation 1]

Next, examples of the imaging lens according to this embodiment will be explained. In each example, f denotes a focal length of the overall optical system of the imaging lens, Fno denotes a F-number, ω denotes a half field of view, ih denotes a maximum image height, and TTL denotes a total track length. Additionally, i denotes a surface number counted from the object side, r denotes a paraxial curvature radius, d denotes a distance between lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 4.92
Fno = 1.80
ω(°) = 47.2
ih = 5.23
TTL = 6.96

Surface Data

| i | r | d | Nd | vd | |
|---|---|---|---|---|---|
| (Object) | Infinity | Infinity | | | |
| 1* | 2.9696 | 0.5761 | 1.535 | 55.69 | (vd1) |
| 2* | 8.3824 | 0.0649 | | | |
| 3 (Stop) | Infinity | 0.5342 | | | |
| 4* | −37.4630 | 0.6030 | 1.535 | 55.69 | (vd2) |
| 5* | −3.5862 | 0.0666 | | | |
| 6* | −19.1467 | 0.2900 | 1.671 | 19.24 | (vd3) |
| 7* | 10.2844 | 0.2876 | | | |
| 8* | −22.1440 | 0.5561 | 1.639 | 23.52 | (vd4) |
| 9* | 34.1731 | 0.2783 | | | |
| 10* | −3.7063 | 0.6337 | 1.614 | 25.59 | (vd5) |
| 11* | −2.6950 | 0.0650 | | | |
| 12* | 1.8901 | 0.5863 | 1.535 | 55.69 | (vd6) |
| 13* | 3.0274 | 0.6665 | | | |
| 14* | 5.9039 | 0.5010 | 1.661 | 20.37 | (vd7) |
| 15* | 2.0265 | 0.3731 | | | |
| 16 | Infinity | 0.2100 | 1.517 | 64.20 | |
| 17 Image Plane | Infinity | 0.7392 | | | |

Constituent Lens Data

| Lens | Start Surface | Focal Length | TTL to diagonal length of effective image area |
|---|---|---|---|
| 1 | 1 | 8.291 | 0.66 |
| 2 | 4 | 7.370 | |
| 3 | 6 | −9.936 | |
| 4 | 8 | −20.942 | |
| 5 | 10 | 12.984 | |
| 6 | 12 | 7.975 | |
| 7 | 14 | −4.923 | |

Aspheric Surface Data

| | 1st Surface | 2nd Surface | 4th Surface | 5th Surface | 6th Surface | 7th Surface | 8th Surface |
|---|---|---|---|---|---|---|---|
| k | −2.431892E+00 | 0.000000E+00 | 0.000000E+00 | 7.030967E−01 | 0.000000E+00 | 0.000000E+00 | 0.000000E+00 |
| A4 | 6.418554E−03 | −8.381210E−03 | −9.186036E−04 | 5.789547E−02 | 9.713788E−02 | 7.887578E−02 | 1.372524E−02 |
| A6 | −2.348367E−03 | −1.851117E−02 | −1.327319E−01 | −1.623163E−01 | −2.199950E−01 | −1.902509E−01 | −1.578319E−01 |
| A8 | −4.453116E−03 | 4.419062E−02 | 4.056604E−01 | 1.267072E−01 | 1.320647E−01 | 2.453560E−01 | 1.834876E−01 |
| A10 | 9.089699E−03 | −8.296773E−02 | −7.687132E−01 | −1.310602E−02 | 6.667981E−02 | −2.184234E−01 | −8.986731E−02 |
| A12 | −1.166390E−02 | 9.126999E−02 | 9.019172E−01 | −6.912905E−02 | −2.154014E−01 | 1.291832E−01 | 1.172659E−02 |
| A14 | 7.827073E−03 | −6.235786E−02 | −6.663000E−01 | 6.837358E−02 | 1.972148E−01 | −4.943658E−02 | 8.113297E−03 |
| A16 | −3.004209E−03 | 2.577297E−02 | 3.014754E−01 | −3.120547E−02 | −9.296984E−02 | 1.174304E−02 | −4.224029E−03 |
| A18 | 6.174587E−04 | −5.844065E−03 | −7.622953E−02 | 7.215238E−03 | 2.267052E−02 | −1.574917E−03 | 8.025495E−04 |
| A20 | −5.252064E−05 | 5.528373E−04 | 8.233619E−03 | −6.845590E−04 | −2.263376E−03 | 9.105800E−05 | −5.713798E−05 |

| | 9th Surface | 10th Surface | 11th Surface | 12th Surface | 13th Surface | 14th Surface | 15th Surface |
|---|---|---|---|---|---|---|---|
| k | 0.000000E+00 | −1.304594E+01 | −3.810076E+00 | −8.840349E+00 | −1.616896E+00 | 7.009283E−01 | −3.127274E+00 |
| A4 | 9.583581E−02 | 1.949442E−01 | 5.030324E−03 | 7.259213E−02 | 7.052777E−02 | −4.328516E−02 | −6.210609E−02 |
| A6 | −1.980589E−01 | −1.201404E−01 | 2.779904E−02 | −5.150102E−02 | −6.266415E−02 | −7.336503E−03 | 1.543159E−02 |
| A8 | 1.609688E−01 | 4.358290E−02 | −1.643520E−03 | 1.374229E−02 | 2.215991E−02 | 6.907330E−03 | −2.638633E−03 |
| A10 | −9.649281E−02 | −7.926872E−03 | −5.321411E−03 | −1.903133E−03 | −4.906894E−03 | −1.796265E−03 | 3.506890E−04 |
| A12 | 4.385749E−02 | −2.902707E−04 | 2.206409E−03 | 1.904854E−05 | 7.135877E−04 | 2.515387E−04 | −3.575497E−05 |
| A14 | −1.411938E−02 | 4.389329E−04 | −4.180369E−04 | 3.606352E−05 | −6.756968E−05 | −2.102395E−05 | 2.555943E−06 |
| A16 | 2.955302E−03 | −8.527369E−05 | 4.320251E−05 | −5.250148E−06 | 3.979151E−06 | 1.049477E−06 | −1.162103E−07 |
| A18 | −3.533399E−04 | 7.113102E−06 | −2.359329E−06 | 3.096506E−07 | −1.311089E−07 | −2.890755E−08 | 2.971239E−09 |
| A20 | 1.806804E−05 | −2.201023E−07 | 5.340951E−08 | −6.840953E−09 | 1.831721E−09 | 3.382408E−10 | −3.231999E−11 |

The imaging lens in Example 1 achieves a ratio of a total track length to a diagonal length of an effective image area of the image sensor of 0.66, and a F number of 1.80. As shown in Table 6, the imaging lens in Example 1 satisfies the conditional expressions (1) to (23).

Figure 2:
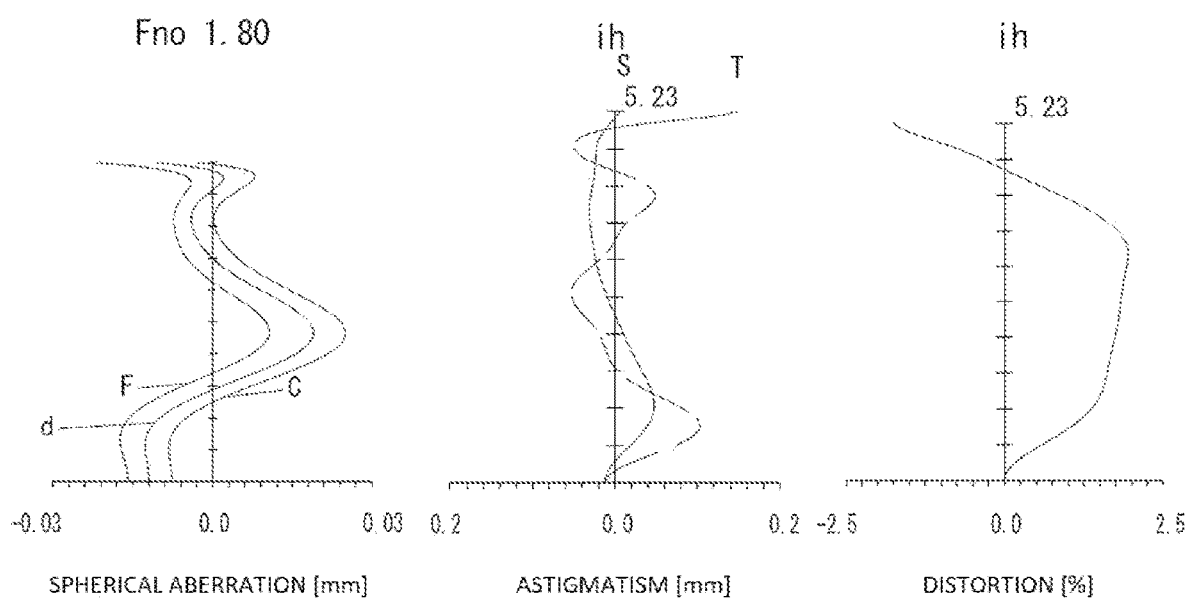
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, and 10). As shown in FIG. 2, each aberration is corrected excellently.

Example 2

The basic lens data is shown below in Table 2.

TABLE 2

Example 2
Unit mm
f = 6.72
Fno = 1.80
ω(°) = 39.4
ih = 5.60
TTL = 7.43

Surface Data

| i | r | d | Nd | vd | |
|---|---|---|---|---|---|
| (Object) | Infinity | Infinity | | | |
| 1 (Stop) | Infinity | −0.9135 | | | |
| 2* | 2.3377 | 1.1523 | 1.535 | 55.69 | (vd1) |
| 3* | 7.9155 | 0.0539 | | | |
| 4* | 7.4476 | 0.3000 | 1.671 | 19.24 | (vd2) |
| 5* | 4.3811 | 0.4880 | | | |
| 6* | 34.3756 | 0.4530 | 1.614 | 25.59 | (vd3) |
| 7* | 34.8329 | 0.1807 | | | |
| 8* | 10.5885 | 0.3500 | 1.671 | 19.24 | (vd4) |
| 9* | 11.7903 | 0.3203 | | | |
| 10* | 91.2186 | 0.5509 | 1.535 | 55.69 | (vd5) |
| 11* | −21.3260 | 0.7305 | | | |
| 12* | 4.7511 | 0.5600 | 1.535 | 55.69 | (vd6) |
| 13* | 16.6480 | 0.5895 | | | |
| 14* | −7.4039 | 0.7000 | 1.535 | 55.69 | (vd7) |
| 15* | 3.7352 | 0.4999 | | | |
| 16 | Infinity | 0.2100 | 1.517 | 64.20 | |
| 17 | Infinity | 0.3606 | | | |
| Image Plane | | | | | |

Constituent Lens Data

| Lens | Start Surface | Focal Length | TTL to diagonal length of effective image area |
|---|---|---|---|
| 1 | 2 | 5.787 | 0.66 |
| 2 | 4 | −16.512 | |
| 3 | 6 | 3095.945 | |
| 4 | 8 | 138.654 | |
| 5 | 10 | 32.375 | |
| 6 | 12 | 12.231 | |
| 7 | 14 | −4.543 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000000E+00 | 0.000000E+00 | 0.000000E+00 | 0.000000E+00 | 0.000000E+00 | 0.000000E+00 | −1.000000E+00 |
| A4 | −5.071766E−04 | −3.744768E−02 | −4.471005E−02 | −6.704985E−03 | −3.284743E−03 | −2.588950E−02 | −4.359124E−02 |
| A6 | 2.800957E−03 | 3.328478E−02 | 4.058059E−02 | 6.729788E−03 | −5.112136E−02 | −7.614853E−03 | 2.188266E−02 |
| A8 | −3.434894E−03 | −2.139690E−02 | −2.028866E−02 | 1.002690E−02 | 1.389376E−01 | 3.533797E−02 | −4.005407E−02 |
| A10 | 2.924230E−03 | 1.290997E−02 | 9.087988E−03 | −2.792203E−04 | −2.198910E−01 | −6.621246E−02 | 4.045349E−02 |
| A12 | −1.566554E−03 | −7.260650E−03 | −5.067841E−03 | −1.815628E−02 | 2.176640E−01 | 6.908509E−02 | −2.728492E−02 |
| A14 | 5.327274E−04 | 3.113649E−03 | 2.768939E−03 | 2.154539E−02 | −1.356198E−01 | −4.290024E−02 | 1.238588E−02 |
| A16 | −1.115830E−04 | −8.640113E−04 | −9.821346E−04 | −1.125767E−02 | 5.163836E−02 | 1.569315E−02 | −3.702440E−03 |
| A18 | 1.318848E−05 | 1.352437E−04 | 1.887920E−04 | 2.867936E−03 | −1.097315E−02 | −3.130534E−03 | 6.644912E−04 |
| A20 | −7.131844E−07 | −9.020443E−06 | −1.492598E−05 | −2.846291E−04 | 9.981068E−04 | 2.625281E−04 | −5.487171E−05 |

| | 9th Surface | 10th Surface | 11th Surface | 12th Surface | 13th Surface | 14th Surface | 15th Surface |
|---|---|---|---|---|---|---|---|
| k | −1.000000E+00 | 0.000000E+00 | 0.000000E+00 | −7.614288E−01 | 0.000000E+00 | 0.000000E+00 | −2.114714E+01 |
| A4 | −3.818579E−02 | −4.214543E−02 | −4.568665E−02 | −2.048347E−02 | −1.879396E−03 | −7.914826E−02 | −4.194300E−02 |
| A6 | 1.969588E−02 | 7.148699E−03 | 8.344303E−03 | −5.758350E−03 | −1.058004E−02 | 2.829306E−02 | 1.298833E−02 |
| A8 | −2.217031E−02 | 6.774398E−03 | 2.459214E−03 | 2.581139E−03 | 5.403772E−03 | −4.968755E−03 | −2.438848E−03 |

TABLE 2-continued

Example 2
Unit mm
f = 6.72
Fno = 1.80
ω(°) = 39.4
ih = 5.60
TTL = 7.43

| | | | | | | | |
|---|---|---|---|---|---|---|---|
| A10 | 1.521899E−02 | −9.092219E−03 | −3.158697E−03 | −7.951494E−04 | −1.669247E−03 | 5.547065E−04 | 2.920025E−04 |
| A12 | −6.688315E−03 | 5.164892E−03 | 1.549140E−03 | 1.148108E−04 | 3.232250E−04 | −4.212677E−05 | −2.317645E−05 |
| A14 | 1.908152E−03 | −1.538876E−03 | −3.942376E−04 | −4.375789E−06 | −3.863590E−05 | 2.197505E−06 | 1.213010E−06 |
| A16 | −3.160326E−04 | 2.517316E−04 | 5.445851E−05 | −4.440542E−07 | 2.771198E−06 | −7.600936E−08 | −3.989311E−08 |
| A18 | 2.537403E−05 | −2.154784E−05 | −3.900925E−06 | 4.186573E−08 | −1.097922E−07 | 1.576817E−09 | 7.412655E−10 |
| A20 | −6.220046E−07 | 7.565638E−07 | 1.139660E−07 | −8.990463E−10 | 1.853280E−09 | −1.488810E−11 | −5.901365E−12 |

The imaging lens in Example 2 achieves a ratio of a total track length to a diagonal length of an effective image area of the image sensor of 0.66, and a F number of 1.80. As shown in Table 6, the imaging lens in Example 2 satisfies the conditional expressions (1) to (23).

Figure 4:
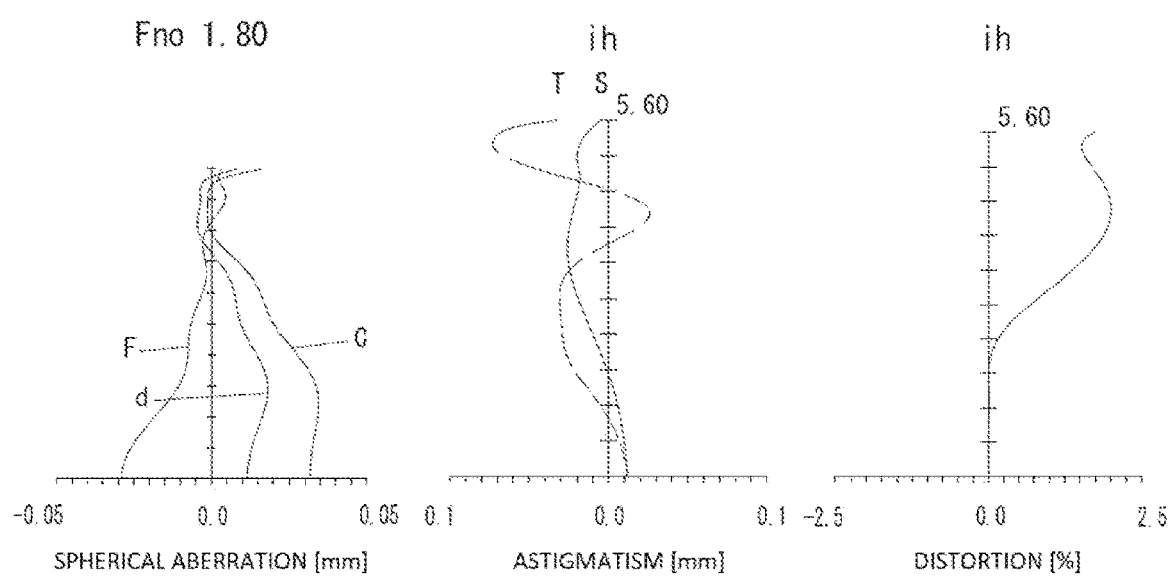
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 6.72
Fno = 1.90
ω(°) = 39.2
ih = 5.60
TTL = 7.73

Surface Data

| i | r | d | Nd | vd | |
|---|---|---|---|---|---|
| (Object) | Infinity | Infinity | | | |
| 1 (Stop) | Infinity | −0.3731 | | | |
| 2* | 2.9839 | 0.5648 | 1.535 | 55.69 | (vd1) |
| 3* | 3.7310 | 0.2154 | | | |
| 4* | 2.9517 | 0.8145 | 1.535 | 55.69 | (vd2) |
| 5* | 47.6558 | 0.0419 | | | |
| 6* | 95.9674 | 0.3305 | 1.661 | 20.37 | (vd3) |
| 7* | 6.0218 | 0.5391 | | | |
| 8* | 22.7066 | 0.5143 | 1.671 | 19.24 | (vd4) |
| 9* | 90.6004 | 0.7951 | | | |
| 10* | −6.1998 | 0.5902 | 1.535 | 55.69 | (vd5) |
| 11* | −3.4503 | 0.0690 | | | |
| 12* | 3.7088 | 0.5400 | 1.639 | 23.52 | (vd6) |
| 13* | 3.3811 | 0.9049 | | | |
| 14* | −8.2178 | 0.6500 | 1.535 | 55.69 | (vd7) |
| 15* | 5.6595 | 0.1490 | | | |
| 16 | Infinity | 0.2100 | 1.517 | 64.20 | |
| 17 | Infinity | 0.8700 | | | |
| Image Plane | | | | | |

Constituent Lens Data

| Lens | Start Surface | Focal Length | TTL to diagonal length of effective image area |
|---|---|---|---|
| 1 | 2 | 22.054 | 0.69 |
| 2 | 4 | 5.846 | |
| 3 | 6 | −9.738 | |
| 4 | 8 | 45.038 | |
| 5 | 10 | 13.535 | |
| 6 | 12 | −167.530 | |
| 7 | 14 | −6.166 | |

TABLE 3-continued

Example 3
Unit mm
f = 6.72
Fno = 1.90
ω(°) = 39.2
ih = 5.60
TTL = 7.73

Aspheric Surface Data

|     | 2nd Surface | 3rd Surface | 4th Surface | 5th Surface | 6th Surface | 7th Surface | 8th Surface |
|-----|-------------|-------------|-------------|-------------|-------------|-------------|-------------|
| k   | −1.849923E+00 | −7.382718E+00 | −2.769605E+00 | 0.000000E+00 | 0.000000E+00 | 5.302558E+00 | 0.000000E+00 |
| A4  | −6.265716E−03 | −1.613661E−02 | −1.210591E−02 | −4.711808E−02 | −3.412235E−02 | 6.569761E−04 | −2.818239E−02 |
| A6  | 1.161950E−02 | 4.284868E−04 | 1.410604E−02 | 3.162980E−02 | 3.773663E−02 | 8.238525E−03 | 1.776851E−03 |
| A8  | −2.216782E−02 | 1.392261E−03 | −2.266321E−02 | 8.317084E−03 | 1.169499E−02 | 1.785887E−02 | −6.630992E−03 |
| A10 | 2.173114E−02 | −4.568241E−03 | 2.476830E−02 | −3.727876E−02 | −5.750636E−02 | −4.631869E−02 | 1.591351E−02 |
| A12 | −1.322498E−02 | 5.711455E−03 | −1.571826E−02 | 3.560212E−02 | 6.005424E−02 | 4.863709E−02 | −2.050048E−02 |
| A14 | 5.025954E−03 | −3.355517E−03 | 6.448059E−03 | −1.843363E−02 | −3.445125E−02 | −2.928785E−02 | 1.457763E−02 |
| A16 | −1.160450E−03 | 1.041653E−03 | −1.701799E−03 | 5.562373E−03 | 1.170987E−02 | 1.047621E−02 | −5.884827E−03 |
| A18 | 1.493802E−04 | −1.662146E−04 | 2.616943E−04 | −9.101134E−04 | −2.197249E−03 | −2.056836E−03 | 1.266834E−03 |
| A20 | −8.283309E−06 | 1.068937E−05 | −1.773496E−05 | 6.195571E−05 | 1.752210E−04 | 1.707859E−04 | −1.124974E−04 |

|     | 9th Surface | 10th Surface | 11th Surface | 12th Surface | 13th Surface | 14th Surface | 15th Surface |
|-----|-------------|--------------|--------------|--------------|--------------|--------------|--------------|
| k   | 0.000000E+00 | 3.220087E+00 | −1.186055E+00 | −1.964948E+00 | −2.448687E+00 | −4.979628E+00 | 0.000000E+00 |
| A4  | −2.866583E−02 | 4.043124E−02 | 2.683855E−02 | −3.199149E−02 | −2.801804E−02 | −2.888410E−02 | −3.710406E−02 |
| A6  | 1.468099E−02 | −2.673440E−02 | −1.784698E−02 | −1.399394E−02 | −1.184192E−02 | −8.223544E−03 | 4.639806E−04 |
| A8  | −3.096984E−02 | 1.741816E−02 | 8.189987E−03 | 3.985822E−03 | 5.774134E−03 | 5.287288E−03 | 2.016323E−03 |
| A10 | 3.418907E−02 | −1.276945E−02 | −2.927903E−03 | −3.741686E−04 | −8.689256E−04 | −1.095308E−03 | −5.522028E−04 |
| A12 | −2.337439E−02 | 6.621744E−03 | 9.354950E−04 | −1.423859E−04 | −1.022614E−05 | 1.259591E−04 | 7.389665E−05 |
| A14 | 1.001980E−02 | −2.279128E−03 | −3.212726E−04 | −1.248050E−05 | 1.871132E−05 | −8.848598E−06 | −5.717389E−06 |
| A16 | −2.621007E−03 | 4.779203E−04 | 7.580613E−05 | 1.250464E−05 | −2.314535E−06 | 3.783385E−07 | 2.592005E−07 |
| A18 | 3.827866E−04 | −5.426921E−05 | −9.000961E−06 | −1.691651E−06 | 1.203512E−07 | −9.066499E−09 | −6.391688E−09 |
| A20 | −2.379313E−05 | 2.558595E−06 | 4.077806E−07 | 7.067409E−08 | −2.371347E−09 | 9.352790E−11 | 6.620258E−11 |

The imaging lens in Example 3 achieves a ratio of a total track length to a diagonal length of an effective image area of the image sensor of 0.69, and a F number of 1.90. As shown in Table 6, the imaging lens in Example 3 satisfies the conditional expressions (1) to (23).

Figure 6:
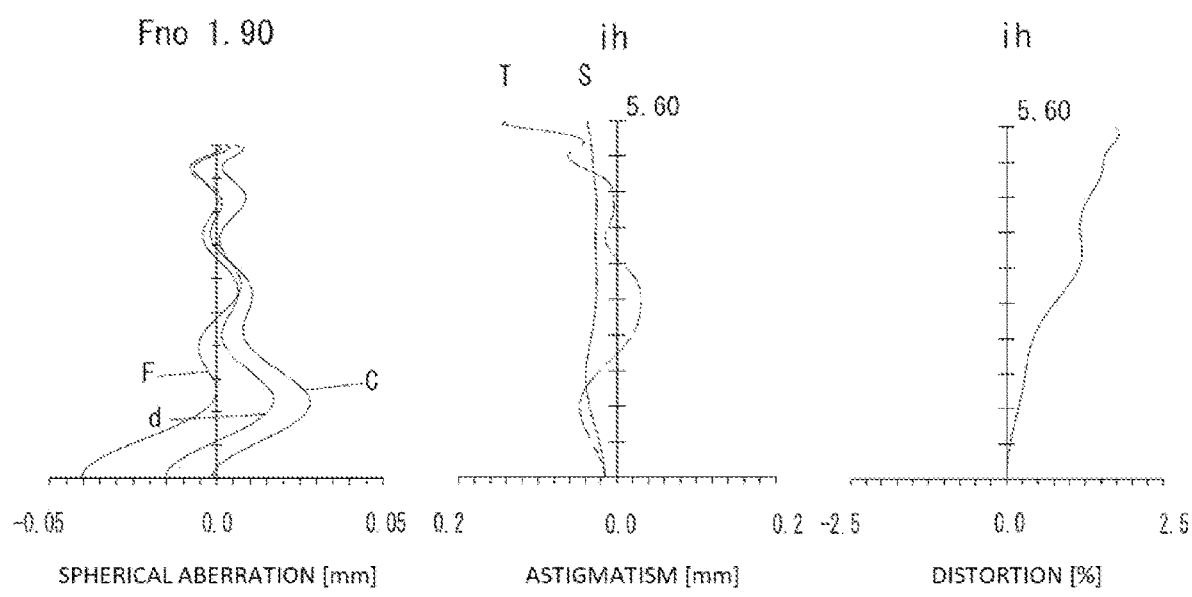
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 6.72
Fno = 1.80
ω(°) = 39.2
ih = 5.60
TTL = 7.73

Surface Data

| i | r | d | Nd | vd | |
|---|---|---|----|----|--|
| (Object) | Infinity | Infinity | | | |
| 1 (Stop) | Infinity | −0.3850 | | | |
| 2* | 3.0777 | 0.5796 | 1.535 | 55.69 | (vd1) |
| 3* | 4.7310 | 0.2532 | | | |
| 4* | 3.6015 | 0.7600 | 1.535 | 55.69 | (vd2) |
| 5* | 28.0194 | 0.0350 | | | |
| 6* | 12.1055 | 0.2900 | 1.671 | 19.24 | (vd3) |
| 7* | 4.8636 | 0.6798 | | | |
| 8* | 28.9085 | 0.4958 | 1.671 | 19.24 | (vd4) |
| 9* | 76.9083 | 0.7938 | | | |
| 10* | −5.5068 | 0.6110 | 1.535 | 55.69 | (vd5) |
| 11* | −2.9091 | 0.0500 | | | |

TABLE 4-continued

Example 4
Unit mm
f = 6.72
Fno = 1.80
ω(°) = 39.2
ih = 5.60
TTL = 7.73

| | | | | | | |
|---|---|---|---|---|---|---|
| 12* | 3.2016 | 0.4860 | | 1.671 | 19.24 | (vd6) |
| 13* | 2.9079 | 1.0249 | | | | |
| 14* | −3.0406 | 0.5985 | | 1.535 | 55.69 | (vd7) |
| 15* | −118.4326 | 0.1182 | | | | |
| 16 | Infinity | 0.2100 | | 1.517 | 64.20 | |
| 17 | Infinity | 0.8116 | | | | |
| Image Plane | | | | | | |

Constituent Lens Data

| Lens | Start Surface | Focal Length | TTL to diagonal length of effective image area |
|---|---|---|---|
| 1 | 2 | 14.675 | 0.69 |
| 2 | 4 | 7.644 | |
| 3 | 6 | −12.319 | |
| 4 | 8 | 68.771 | |
| 5 | 10 | 10.657 | |
| 6 | 12 | −140.826 | |
| 7 | 14 | −5.846 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.911496E+00 | −1.047749E+01 | −1.951982E+00 | 0.000000E+00 | 0.000000E+00 | 2.837879E−01 | 0.000000E+00 |
| A4 | −5.481841E−03 | −1.018017E−02 | −1.115353E−02 | −4.832092E−02 | −3.832947E−02 | −3.939997E−03 | −3.332565E−02 |
| A6 | 1.493936E−02 | −6.675746E−03 | 7.771204E−03 | 3.980470E−02 | 3.092102E−02 | −1.193836E−03 | 1.285440E−02 |
| A8 | −3.436958E−02 | 9.717859E−03 | −1.465791E−02 | 2.381521E−02 | 4.519816E−02 | 3.807379E−02 | −2.134984E−02 |
| A10 | 4.082263E−02 | −8.716794E−03 | 2.299611E−02 | −8.411553E−02 | −1.137520E−01 | −6.909905E−02 | 1.834622E−02 |
| A12 | −2.970144E−02 | 5.092687E−03 | −1.978520E−02 | 8.205890E−02 | 1.061427E−01 | 6.323006E−02 | −9.828031E−03 |
| A14 | 1.334281E−02 | −1.826554E−03 | 1.036390E−02 | −4.265598E−02 | −5.486488E−02 | −3.400138E−02 | 3.327216E−03 |
| A16 | −3.609574E−03 | 3.826356E−04 | −3.269506E−03 | 1.269977E−02 | 1.650160E−02 | 1.086662E−02 | −7.214690E−04 |
| A18 | 5.392731E−04 | −4.196460E−05 | 5.693564E−04 | −2.039698E−03 | −2.699609E−03 | −1.906294E−03 | 9.274910E−05 |
| A20 | −3.419038E−05 | 1.735395E−06 | −4.218537E−05 | 1.367446E−04 | 1.855649E−04 | 1.416283E−04 | −4.947002E−06 |

| | 9th Surface | 10th Surface | 11th Surface | 12th Surface | 13th Surface | 14th Surface | 15th Surface |
|---|---|---|---|---|---|---|---|
| k | 0.000000E+00 | 3.225833E+00 | −1.784837E+00 | −2.359668E+00 | −2.779385E+00 | −8.088081E+00 | 0.000000E+00 |
| A4 | −2.415392E−02 | 7.044705E−02 | 4.818379E−02 | −5.094070E−02 | −6.454121E−02 | −4.302354E−02 | −1.519735E−02 |
| A6 | −6.737797E−04 | −6.457015E−02 | −4.104931E−02 | −1.179031E−03 | 1.927057E−02 | 7.601844E−03 | 1.568931E−04 |
| A8 | −4.989860E−03 | 5.496782E−02 | 3.134709E−02 | 8.975729E−03 | −5.834221E−03 | −2.857903E−04 | 9.838055E−04 |
| A10 | 4.620647E−03 | −3.546763E−02 | −1.592481E−02 | −5.403597E−03 | 1.279527E−03 | −7.790696E−05 | −2.792510E−04 |
| A12 | −2.150915E−03 | 1.482630E−02 | 4.683048E−03 | 1.609536E−03 | −1.843576E−04 | 1.523609E−05 | 3.854749E−05 |
| A14 | 5.131810E−04 | −4.027450E−03 | −8.045167E−04 | −2.699856E−04 | 1.695990E−05 | −1.364564E−06 | −3.079190E−06 |
| A16 | −3.535809E−05 | 6.919633E−04 | 8.024904E−05 | 2.570432E−05 | −9.531668E−07 | 6.936964E−08 | 1.441138E−07 |
| A18 | −9.037735E−06 | −6.809775E−05 | −4.315591E−06 | −1.284132E−06 | 2.959833E−08 | −1.919278E−09 | −3.655870E−09 |
| A20 | 1.603469E−06 | 2.907498E−06 | 9.666035E−08 | 2.584326E−08 | −3.838741E−10 | 2.243859E−11 | 3.870790E−11 |

The imaging lens in Example 4 achieves a ratio of a total track length to a diagonal length of an effective image area of the image sensor of 0.69, and a F number of 1.80. As shown in Table 6, the imaging lens in Example 4 satisfies the conditional expressions (1) to (23).

Figure 8:
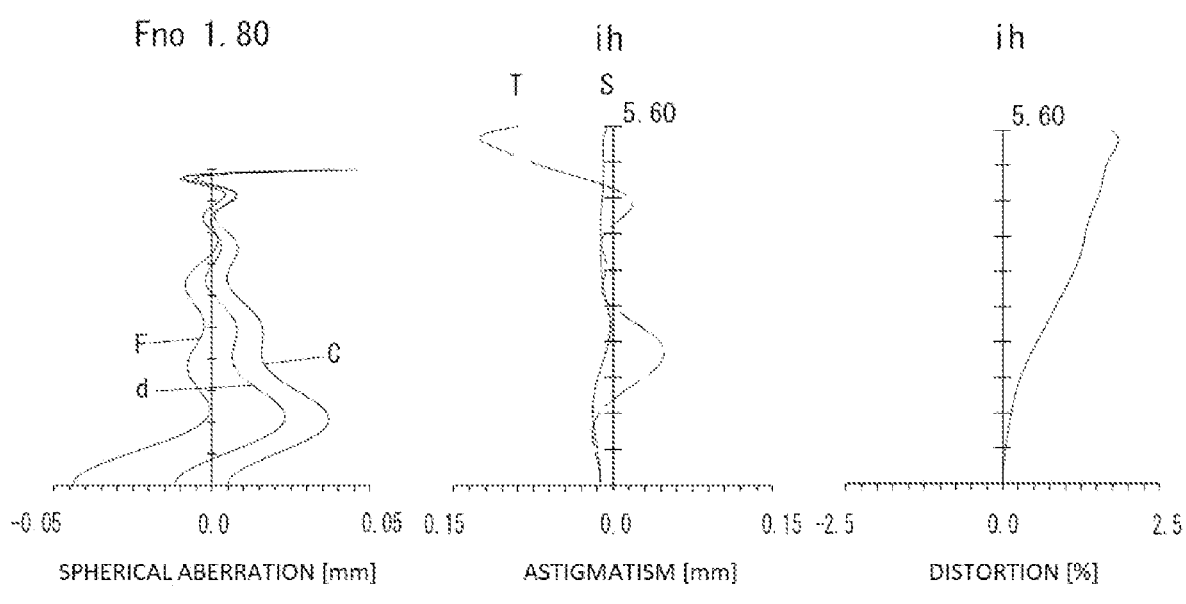
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 7.16
Fno = 1.94
ω(°) = 48.4
ih = 7.93
TTL = 8.24

Surface Data

| i | r | d | Nd | vd | |
|---|---|---|----|----|---|
| (Object) | Infinity | Infinity | | | |
| 1 (Stop) | Infinity | −0.5230 | | | |
| 2* | 2.7725 | 0.7359 | 1.535 | 55.69 | (vd1) |
| 3* | 6.4046 | 0.3902 | | | |
| 4* | 23.4403 | 0.7458 | 1.535 | 55.69 | (vd2) |
| 5* | −10.3073 | 0.0450 | | | |
| 6* | −13.3126 | 0.3600 | 1.671 | 19.24 | (vd3) |
| 7* | −26.0691 | 0.8351 | | | |
| 8* | −14.7058 | 0.6693 | 1.661 | 20.37 | (vd4) |
| 9* | −11.1536 | 0.5382 | | | |
| 10* | −21.8979 | 0.6900 | 1.535 | 55.69 | (vd5) |
| 11* | −21.8957 | 0.2740 | | | |
| 12* | 13.7523 | 0.7209 | 1.588 | 28.36 | (vd6) |
| 13* | 9.4161 | 0.2294 | | | |
| 14* | 14.4752 | 0.7950 | 1.567 | 37.40 | (vd7) |
| 15* | 3.1942 | 0.3663 | | | |
| 16 | Infinity | 0.1500 | 1.517 | 64.20 | |
| 17 | Infinity | 0.7491 | | | |
| Image Plane | | | | | |

Constituent Lens Data

| Lens | Start Surface | Focal Length | TTL to diagonal length of effective image area |
|---|---|---|---|
| 1 | 2 | 8.538 | 0.52 |
| 2 | 4 | 13.490 | |
| 3 | 6 | −41.025 | |
| 4 | 8 | 65.008 | |
| 5 | 10 | 3694.255 | |
| 6 | 12 | −54.161 | |
| 7 | 14 | −7.415 | |

Aspheric Surface Data

| | 2nd Surface | 3rd Surface | 4th Surface | 5th Surface | 6th Surface | 7th Surface | 8th Surface |
|---|---|---|---|---|---|---|---|
| k | −1.178965E+00 | 0.000000E+00 | 0.000000E+00 | 0.000000E+00 | 0.000000E+00 | 0.000000E+00 | 0.000000E+00 |
| A4 | 5.966373E−04 | −1.041809E−03 | −1.459837E−02 | −3.089106E−02 | −2.439832E−02 | 3.512737E−03 | 1.428453E−02 |
| A6 | 5.895645E−03 | −1.160398E−02 | 2.820345E−02 | 3.101863E−02 | 2.862519E−02 | −2.597532E−02 | −5.296348E−02 |
| A8 | −8.700618E−03 | 1.648321E−02 | −4.658878E−02 | −4.877891E−02 | −4.964618E−02 | 6.327811E−02 | 6.909151E−02 |
| A10 | 6.695309E−03 | −1.644277E−02 | 4.769912E−02 | 5.558460E−02 | 6.245667E−02 | −8.521203E−02 | −5.788833E−02 |
| A12 | −3.459317E−03 | 1.000727E−02 | −3.061347E−02 | −4.056860E−02 | −4.981089E−02 | 7.012961E−02 | 3.100665E−02 |
| A14 | 1.122956E−03 | −3.801403E−03 | 1.246766E−02 | 1.842721E−02 | 2.461838E−02 | −3.591729E−02 | −1.070819E−02 |
| A16 | −2.261188E−04 | 8.889950E−04 | −3.099676E−03 | −5.051271E−03 | −7.302043E−03 | 1.120888E−02 | 2.307243E−03 |
| A18 | 2.621862E−05 | −1.153570E−04 | 4.262961E−04 | 7.649141E−04 | 1.195946E−03 | −1.949846E−03 | −2.825731E−04 |
| A20 | −1.346191E−06 | 6.173114E−06 | −2.495768E−05 | −4.912054E−05 | −8.311905E−05 | 1.453566E−04 | 1.498808E−05 |

| | 9th Surface | 10th Surface | 11th Surface | 12th Surface | 13th Surface | 14th Surface | 15th Surface |
|---|---|---|---|---|---|---|---|
| k | 0.000000E+00 | 0.000000E+00 | 0.000000E+00 | 0.000000E+00 | 0.000000E+00 | 0.000000E+00 | −1.010917E+01 |
| A4 | 1.362805E−02 | 5.524405E−02 | 7.064500E−02 | 1.419599E−02 | 6.600608E−03 | −2.542088E−02 | −1.897845E−02 |
| A6 | −1.710310E−02 | −3.342827E−02 | −2.920917E−02 | −9.565644E−03 | −5.942690E−03 | 6.232078E−03 | 3.550929E−03 |
| A8 | 8.889205E−03 | 1.029125E−02 | 6.828095E−03 | 1.930813E−03 | 1.222499E−03 | −8.159655E−04 | −3.994329E−04 |
| A10 | −3.206481E−03 | −2.329567E−03 | −1.070334E−03 | −2.134500E−04 | −1.371951E−04 | 6.554701E−05 | 2.837364E−05 |
| A12 | 7.613120E−04 | 3.660914E−04 | 1.141296E−04 | 1.446454E−05 | 9.515232E−06 | −3.385167E−06 | −1.294916E−06 |

TABLE 5-continued

Example 5
Unit mm
f = 7.16
Fno = 1.94
ω(°) = 48.4
ih = 7.93
TTL = 8.24

| A14 | −1.134958E−04 | −3.735237E−05 | −8.109386E−06 | −6.166604E−07 | −4.188048E−07 | 1.120980E−07 | 3.762496E−08 |
|---|---|---|---|---|---|---|---|
| A16 | 9.879995E−06 | 2.322543E−06 | 3.647575E−07 | 1.617942E−08 | 1.139305E−08 | −2.289976E−09 | −6.697565E−10 |
| A18 | −4.319824E−07 | −7.834733E−08 | −9.345789E−09 | −2.396458E−10 | −1.746502E−10 | 2.620371E−11 | 6.643085E−12 |
| A20 | 6.070789E−09 | 1.064534E−09 | 1.035763E−10 | 1.541931E−12 | 1.153291E−12 | −1.282937E−13 | −2.809372E−14 |

The imaging lens in Example 5 achieves a ratio of a total track length to a diagonal length of an effective image area of the image sensor of 0.52, and a F number of 1.94. As shown in Table 6, the imaging lens in Example 5 satisfies the conditional expressions (1) to (23).

Figure 10:
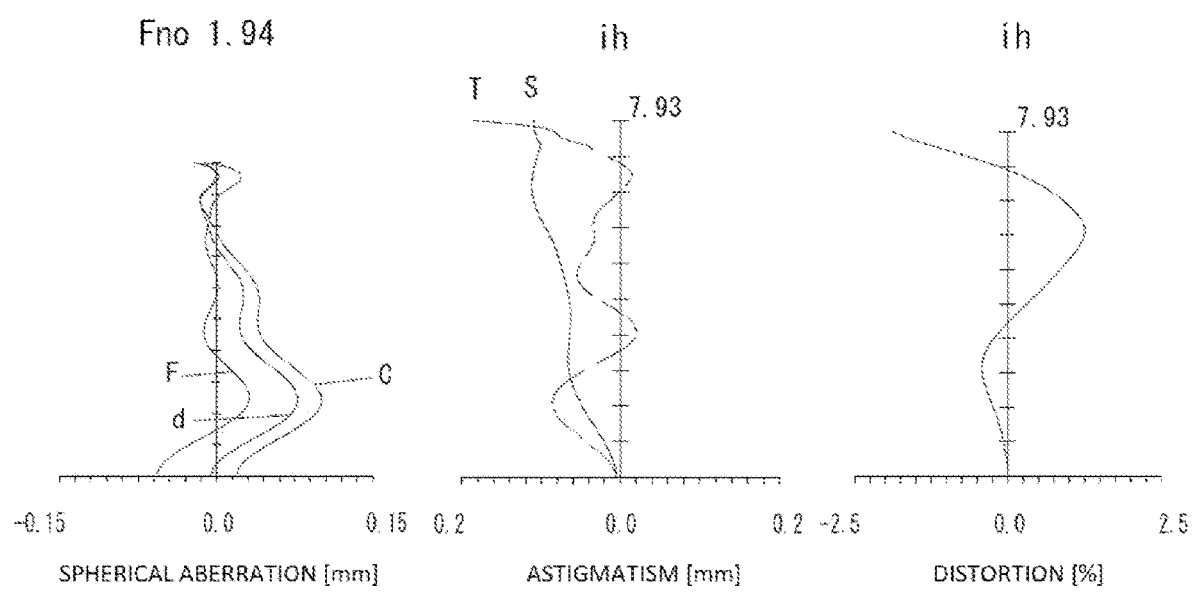
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

In table 6, values of conditional expressions (1) to (23) related to Examples 1 to 5 are shown.

TABLE 6

| Conditional Expression | | Example 1 | Example 2 | Example 3 | Example 4 | Example 5 |
|---|---|---|---|---|---|---|
| (1) | vd3 | 19.24 | 25.59 | 20.37 | 19.24 | 19.24 |
| (2) | vd4 | 23.52 | 19.24 | 19.24 | 19.24 | 20.37 |
| (3) | \|r13\|/f7 | −1.20 | −1.63 | −1.33 | −0.52 | −1.95 |
| (4) | f5 × T4 | 3.61 | 10.37 | 10.76 | 8.46 | 1988.11 |
| (5) | r12/\|r9\| × \|r6\| | 8.40 | 6.36 | 3.28 | 2.57 | 11.21 |
| (6) | \|f4\|/f | 4.26 | 20.63 | 6.70 | 10.24 | 9.09 |
| (7) | r2/\|r6\| | 0.82 | 0.23 | 0.62 | 0.97 | 0.25 |
| (8) | \|r6/r7\| | 0.46 | 3.29 | 0.27 | 0.17 | 1.77 |
| (9) | \|r7\|/f | 4.50 | 1.58 | 3.38 | 4.30 | 2.06 |
| (10) | \|r8\|/f | 6.94 | 1.75 | 13.48 | 11.45 | 1.56 |
| (11) | r10/f5 | −0.208 | −0.659 | −0.255 | −0.273 | −0.006 |
| (12) | f5/f | 2.64 | 4.82 | 2.01 | 1.59 | 516.31 |
| (13) | \|f4\|/f5 | 1.613 | 4.283 | 3.328 | 6.453 | 0.018 |
| (14) | \|f4\|/f5/f7 | −0.328 | −0.943 | −0.540 | −1.104 | −0.002 |
| (15) | f7/f | −1.00 | −0.68 | −0.92 | −0.87 | −1.04 |
| (16) | \|r4\|/f | 0.73 | 0.65 | 7.09 | 4.17 | 1.44 |
| (17) | r4/r5 | 0.19 | 0.13 | 0.50 | 2.31 | 0.77 |
| (18) | \|r6\|/f | 2.09 | 5.18 | 0.90 | 0.72 | 3.64 |
| (19) | r10/f | −0.55 | −3.17 | −0.51 | −0.43 | −3.06 |
| (20) | r12/\|r9\| | 0.82 | 0.18 | 0.55 | 0.53 | 0.43 |
| (21) | r12/\|r13\| | 0.51 | 2.25 | 0.41 | 0.96 | 0.65 |
| (22) | \|r13\|/D7 | 11.78 | 10.58 | 12.64 | 5.08 | 18.21 |
| (23) | \|r14\|/f7 | −0.41 | −0.82 | −0.92 | −20.26 | −0.43 |

When the imaging lens according to the present invention is adopted to a product with the camera function, there is realized contribution to the low profile and the low F-number of the camera, and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
IR: filter
IMG: imaging plane

What is claimed is:
1. An imaging lens comprising, in order from an object side to an image side,
a first lens with positive refractive power,
a second lens,
a third lens,
a fourth lens,
a fifth lens with positive refractive power,
a sixth lens, and
a seventh lens with negative refractive power,
wherein said first lens has an object-side surface being convex in a paraxial region, and said fifth lens has an image-side surface being convex in a paraxial region, and the following conditional expressions (1), (2), (3), (4) and (5) are satisfied:

$$13.00 < vd3 < 33.5 \quad (1)$$

$$13.00 < vd4 < 31.0 \quad (2)$$

$$-3.00 < |r13|/f7 < -0.25 \quad (3)$$

$$2.2 \text{ mm} \leq f5 \times T4 \quad (4)$$

$$1.7 < r12/|r9| \times |r6| < 18.0 \quad (5)$$

where vd3: an abbe number at d-ray of the third lens, vd4: an abbe number at d-ray of the fourth lens, r13: a paraxial curvature radius of an object-side surface of the seventh lens, f7: a focal length of the seventh lens, f5: a focal length of the fifth lens, T4: a distance along the optical axis from an image-side surface of the fourth lens to an object-side surface of the fifth lens, r12: a paraxial curvature radius of an image-side surface of the sixth lens, r9: a paraxial curvature radius of an object-side surface of the fifth lens, and r6: a paraxial curvature radius of an image-side surface of the third lens.

2. The imaging lens according to claim 1, wherein the following conditional expression (6) is satisfied:

$$3.4 < |f4|/f < 31.0 \quad (6)$$

where f4: a focal length of the fourth lens, and f: a focal length of the overall optical system of the imaging lens.

3. The imaging lens according to claim 1, wherein the following conditional expression (7) is satisfied:

$$0.1 < r2/|r6| < 1.5 \quad (7)$$

where r2: a paraxial curvature radius of an image-side surface of the first lens, and r6: a paraxial curvature radius of an image-side surface of the third lens.

4. The imaging lens according to claim 1, wherein the following conditional expression (8) is satisfied:

$$0.1 < |r6/r7| < 5.0 \quad (8)$$

where r6: a paraxial curvature radius of an image-side surface of the third lens, and r7: a paraxial curvature radius of an object-side surface of the fourth lens.

5. The imaging lens according to claim 1, wherein the following conditional expression (9) is satisfied:

$$0.8 < |r7|/f < 7.0 \quad (9)$$

where r7: a paraxial curvature radius of an object-side surface of the fourth lens, and f: a focal length of the overall optical system of the imaging lens.

6. The imaging lens according to claim 1, wherein the following conditional expression (10) is satisfied:

$$1.2 < |r8|/f < 35.0 \quad (10)$$

where r8: a paraxial curvature radius of an image-side surface of the fourth lens, and f: a focal length of the overall optical system of the imaging lens.

7. The imaging lens according to claim 1, wherein the following conditional expression (11) is satisfied:

$$-0.75 < r10/f5 < 0.00 \quad (11)$$

where r10: a paraxial curvature radius of an image-side surface of the fifth lens, and f5: a focal length of the fifth lens.

\* \* \* \* \*